US011517852B2

(12) United States Patent
Hsieh et al.

(10) Patent No.: US 11,517,852 B2
(45) Date of Patent: Dec. 6, 2022

(54) PLASMA AIR PURIFYING DEVICE

(71) Applicant: Ming Chi University of Technology, New Taipei (TW)

(72) Inventors: Jang-Hsing Hsieh, New Taipei (TW); Shu-Chien Chang, New Taipei (TW)

(73) Assignee: MING CHI UNIVERSITY OF TECHNOLOGY, New Taipei (TW)

( * ) Notice: Subject to any disclaimer, the term of this patent is extended or adjusted under 35 U.S.C. 154(b) by 45 days.

(21) Appl. No.: 17/348,323

(22) Filed: Jun. 15, 2021

(65) Prior Publication Data

US 2021/0387138 A1   Dec. 16, 2021

(30) Foreign Application Priority Data

Jun. 15, 2020   (TW) .................................. 109120016

(51) Int. Cl.
*B01D 53/32*   (2006.01)
(52) U.S. Cl.
CPC ........ *B01D 53/32* (2013.01); *B01D 2259/818* (2013.01)
(58) Field of Classification Search
CPC .............. B01D 53/32; B01D 2259/818; B01D 2259/4508
USPC .................................................... 422/186.04
See application file for complete search history.

(56) References Cited

U.S. PATENT DOCUMENTS

| 7,332,020 B2 * | 2/2008 | Tanaka | B03C 3/45 96/95 |
| 7,638,103 B2 * | 12/2009 | Miki | H01J 37/32844 422/186.04 |
| 7,648,683 B2 * | 1/2010 | Miyairi | F01N 3/0892 422/186.04 |
| 2006/0150911 A1 * | 7/2006 | Miyairi | H05H 1/2406 156/345.43 |
| 2006/0152163 A1 * | 7/2006 | Miki | F01N 3/0892 315/111.21 |
| 2006/0254423 A1 * | 11/2006 | Tanaka | B03C 3/45 96/76 |
| 2006/0272505 A1 * | 12/2006 | Tanaka | A61L 9/22 96/96 |

(Continued)

FOREIGN PATENT DOCUMENTS

| CN | 104197425 A | 12/2014 |
| CN | 209438339 U | 9/2019 |

*Primary Examiner* — Tom P Duong

(74) *Attorney, Agent, or Firm* — Muncy, Geissler, Olds & Lowe, P.C.

(57) ABSTRACT

A plasma air purifying device includes a container and at least one plasma-generating element. The container includes a container body, a plurality of first partition plates and a plurality of second partition plates. The container body has an air inlet, an air outlet, and an accommodating space between the air inlet and the air outlet, and the accommodating space includes a plasma zone and a reaction zone. The first partition plates and the second partition plates are staggered in the reaction zone to separate a plurality of reaction chambers. The reaction chambers integrate spatially first through channels of the corresponding first partition plates and second through channels of the corresponding second partition plates so as to form a repetitive bending reaction channel, such that the plasma can purify the air flowing through the air inlet, the plasma zone, the repetitive bending reaction channel and the air outlet.

5 Claims, 5 Drawing Sheets

(56) References Cited

U.S. PATENT DOCUMENTS

| | | | |
|---|---|---|---|
| 2009/0249772 A1* | 10/2009 | Sato | B01D 53/32 60/299 |
| 2010/0293907 A1* | 11/2010 | Zheng | B01D 46/62 55/337 |
| 2011/0116059 A1* | 5/2011 | Katsura | G03F 7/70916 355/30 |

* cited by examiner

PLASMA AIR PURIFYING DEVICE

This application claims the benefit of Taiwan Patent Application Serial No. 109120016, filed Jun. 15, 2020, the subject matter of which is incorporated herein by reference.

BACKGROUND OF THE INVENTION

(1) Field of the Invention

The invention relates to a plasma air purifying device, and more particularly to the plasma air purifying device that is furnished with repetitive bending reaction channels.

(2) Description of the Prior Art

Recently, with rapid development in industrial technology, various manufacturing processes are emerged, but to produce a substantial amount of pollutants, such as exhaust emissions, waste water, waste heat or other waste the like. Although most of these pollutants can be purified to a certain degree by specific pollutant treatment equipments, yet none of those equipments can provide a 100%, or close to 100%, purification upon these pollutants. Therefore, these pollutants will eventually cause adverse environmental influences.

In particular, since the exhaust emissions are usually discharged directly into the atmosphere after some kinds of treatments, thus there is always a risk that these exhaust emissions would be blown or naturally spread to the neighborhood and thus to further jeopardize people's health.

In addition, except for industrial pollutants, vehicles using combustion engines may also contribute a large amount of exhaust emissions. Certainly, air purifying devices are also standard equipment to these vehicles.

Among all types of air purifying devices, a plasma air purifying device is one of those that apply filters to remove harmful substances in the waste emissions. However, such a mean of filter filtration is a physical treatment method, and thus efficiency of filter filtration would be reduced upon when a substantial amount of the harmful substances is accumulated. In an adverse consequence, an overused filter would become a new source of air pollution. Therefore, more and more efforts have been devoted into the air purification technology that does not require consumables such as the filters.

In the existing air purification technology, the main way for effectively purifying air without using filters is to use plasma, positive/negative ions, free radicals or ozone to handle the harmful substances in the exhaust emissions. Particularly, it is understood that using plasma, positive/negative ions, free radicals or ozone to process the exhaust emissions requires a certain reaction time to effectively remove the harmful substances. However, most of the current air purifying devices simply allow the air to pass through a limited space filled with plasma, positive/negative ions or ozone, and thus insufficient reaction time for reaching a satisfied percentage in removing the harmful substances becomes a problem.

SUMMARY OF THE INVENTION

In view that the conventional air purifying device utilizing plasma, positive/negative ions, free radicals or ozone to handle harmful substances in the air is limited in providing only insufficient reaction time, thus a considerable amount of harmful substances can be still discharged into the atmosphere; accordingly, it is an object of the present invention to provide a plasma air purifying device that can effectively extend the reaction time in removing the harmful substances so as to improve the efficiency in purifying the air.

In the present invention, a plasma air purifying device includes a container and at least one plasma-generating element. The container includes a container body, a plurality of first partition plates and a plurality of second partition plates. The container body has an air inlet, an air outlet and an accommodating space located between the air inlet and the air outlet. The accommodating space includes a plasma zone and a reaction zone, the plasma zone is in communication with the air inlet, and the reaction zone is in communication with the plasma zone and the air outlet.

The plurality of first partition plates are disposed in the reaction zone, individually extended from a first lateral side to a second lateral side in a first direction, and separately arranged parallel to each other in the reaction zone in a second direction perpendicular to the first direction. Each of the plurality of first partition plates is furnished with a first through channel close to the first lateral side. The plurality of second partition plates are disposed in the reaction zone, individually extended from the first lateral side to the second lateral side in the first direction, separately arranged parallel to each other in the reaction zone in the second direction, and formed in a stagger manner with the plurality of first partition plates. Each of the plurality of second partition plates is furnished with a second through channel close to the second lateral side.

The at least one plasma-generating element is disposed in the plasma zone, and used for generating a plasma. The plurality of first partition plates and the plurality of second partition plates divide the reaction zone into a plurality of reaction chambers, the plurality of reaction chambers are in communication with the first through channels of the plurality of first partition plates and the second through channels of the plurality of second partition plates to form a repetitive bending reaction channel, the at least one inter-zone connection channel is in communication with the plasma zone and the repetitive bending reaction channel between the first lateral side and the second lateral side, the air inlet is in communication with the air outlet orderly via the plasma zone and the repetitive bending reaction channel, and thus the plasma purifies an air flowing through the air inlet, the plasma zone, the repetitive bending reaction channel and the air outlet to form a purified air.

In one embodiment of the present invention, the container body further has an opening in communication with the accommodating space, and the plasma air purifying device further includes a door frame assembly detachably assembled to seal the opening.

Preferably, the door frame assembly includes a transparent partition and a framework. The transparent partition is disposed at the opening. The framework is detachably positioned to the container body for contacting against the transparent partition so as to have the transparent partition to seal the opening.

In one embodiment of the present invention, the container body includes an air-inlet end plate, an air-outlet end plate and a plurality of lateral plate. The air-inlet end plate is furnished with air inlet. The air-outlet end plate, oppositely disposed to the air-inlet end plate, is furnished with an air outlet. The lateral plates are connected with the air-inlet end plate and the air-outlet end plate so as thereinside to enclose an accommodating space. Preferably, the container body further includes an inter-zone partition plate connected with the lateral plates so as to divide the accommodating space into the plasma zone and the reaction zone. The lateral plates are furnished with at least one inter-zone connection channel in communication with the plasma zone and the reaction zone. In addition, the container body further includes at least one inter-layer partition plate connected with the lateral plates so as to divide the plasma zone into a first plasma-generating space and a second plasma-generating space. The first plasma-generating space is in communication with the air inlet, and the second plasma-generating space is in communication with the at least one inter-zone connection channel. The lateral plates are further furnished with at least one inter-layer connection channel to connect spatially the first plasma-generating space and the second plasma-generating space.

In one embodiment of the present invention, the at least one plasma-generating element is a DCSBD (Diffuse coplanar surface barrier discharge) component.

In one embodiment of the present invention, the plasma air purifying device further includes at least one fan disposed at the air inlet or the air outlet for driving the air to flow into the accommodating space via the air inlet and to flow out of the accommodating space via the air outlet.

As stated, the plasma air purifying device provided by the present invention is mainly to provide the plurality of first partition plates and the plurality of second partition plates into the container body, and thus to utilize the first partition plates and the second partition plates to divide the reaction zone into a plurality of reaction chambers. The plurality of reaction chambers are further integrated spatially to form a unique repetitive bending reaction channel via the first through channels at the corresponding first partition plates and the second through channels at the corresponding second partition plates. Thereupon, after the air introduced from the air inlet enters the plasma zone filled with the plasma, the repetitive bending reaction channel can play a role to elongate the traveling pathway of the air in the plasma zone before the air is discharged into the atmosphere via the air outlet. As such, the harmful substances carried by the air flowing through the plasma zone would have sufficient time to be broken down by the plasma in the plasma zone, and thus the amount of harmful substances contained in the discharged air leaving the air outlet would be significantly reduced.

All these objects are achieved by the plasma air purifying device described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a plasma air purifying device. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
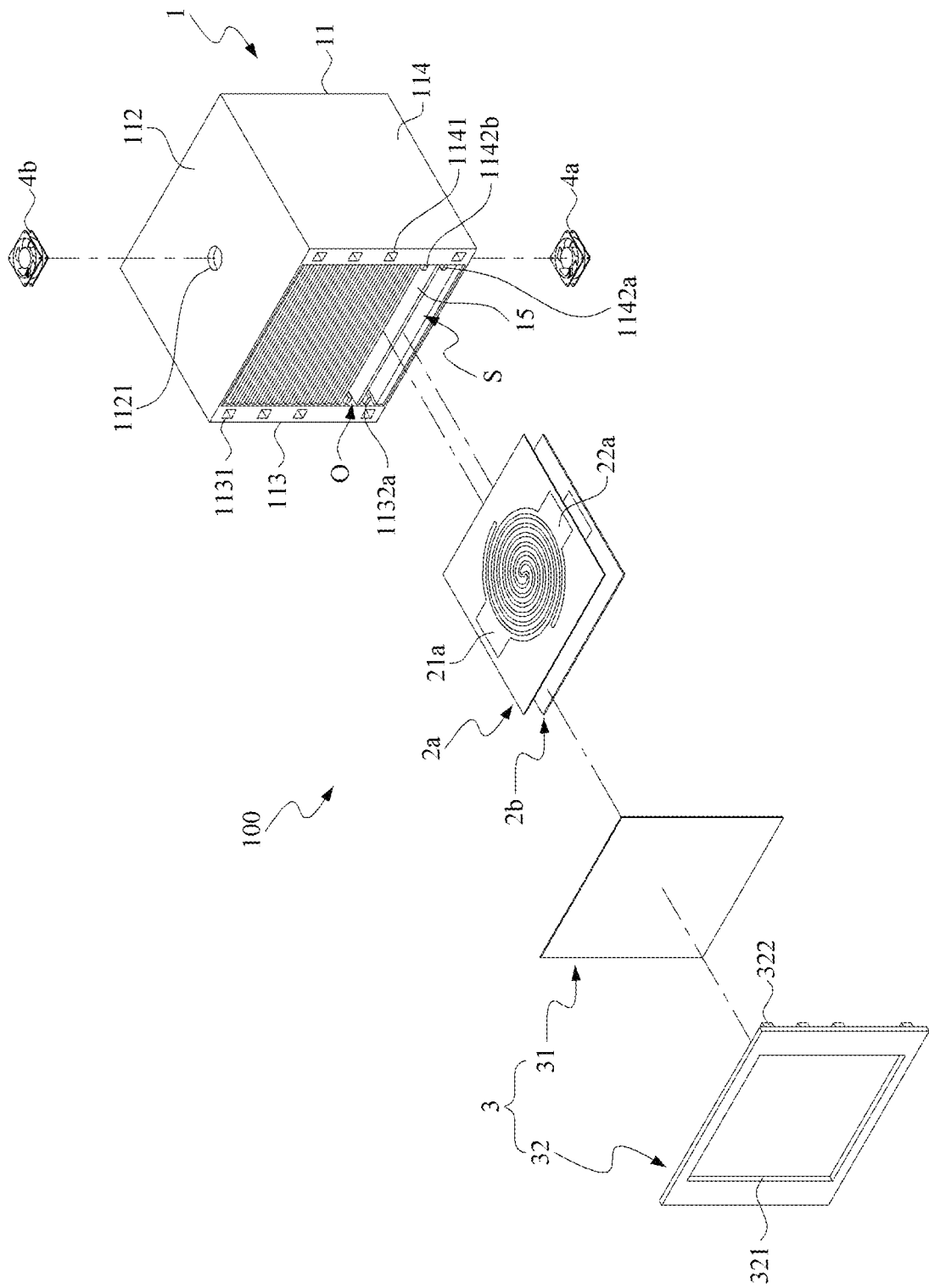
FIG. 1 is a schematic exploded view of a preferred embodiment of the plasma air purifying device in accordance with the present invention.
Figure 2:
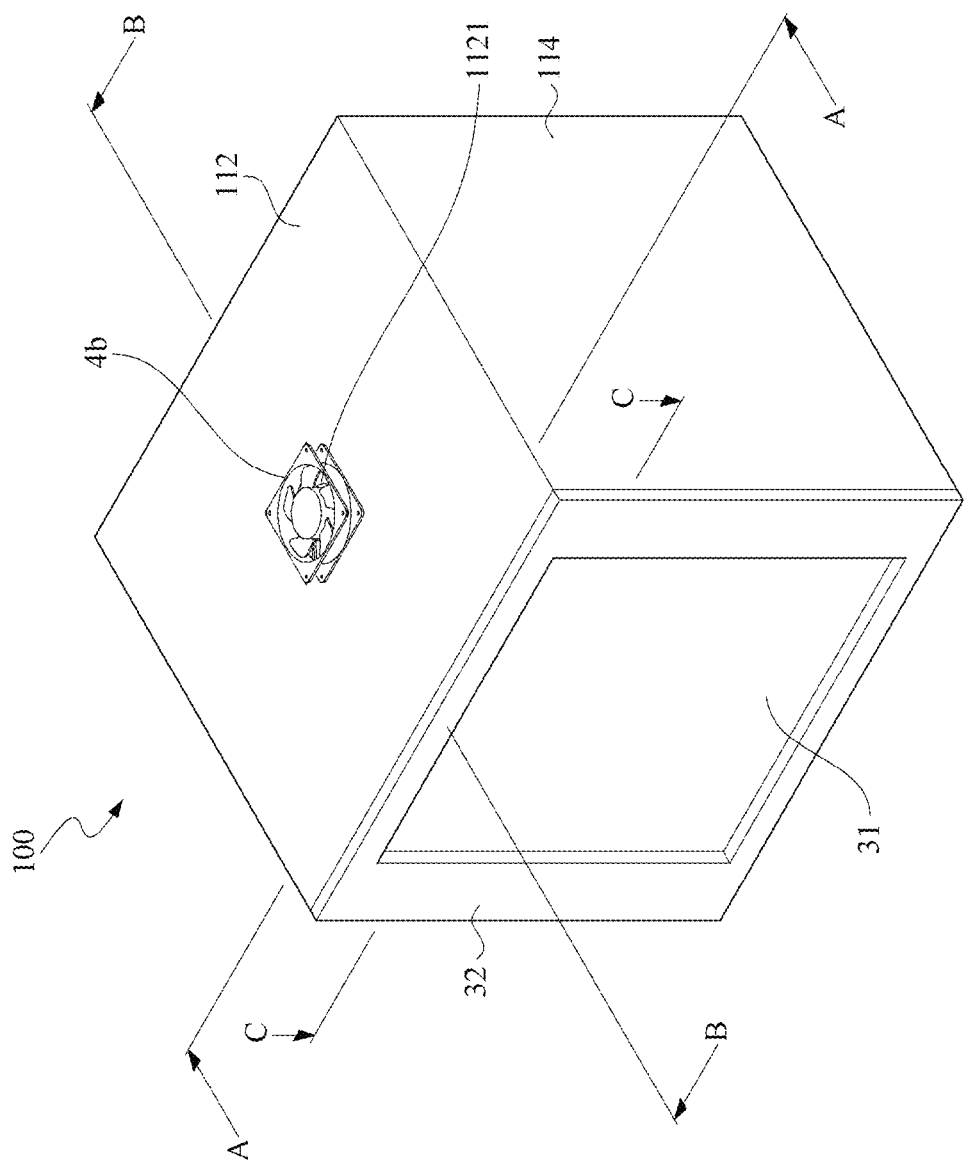
FIG. 2 is a schematic perspective view of FIG. 1.
Figure 3:
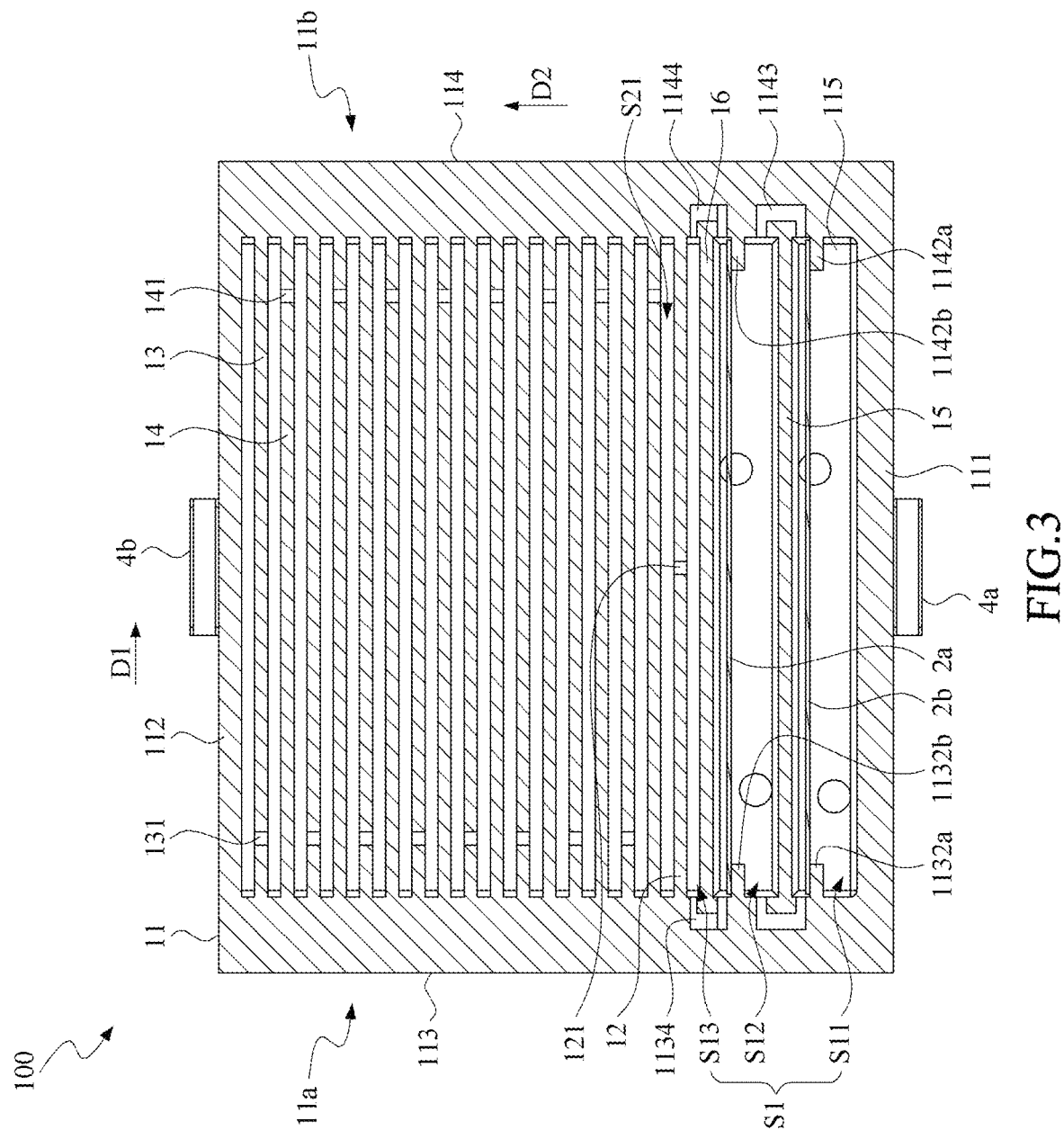
FIG. 3 is a schematic cross-sectional view of FIG. 2 along line A-A.
Figure 4:
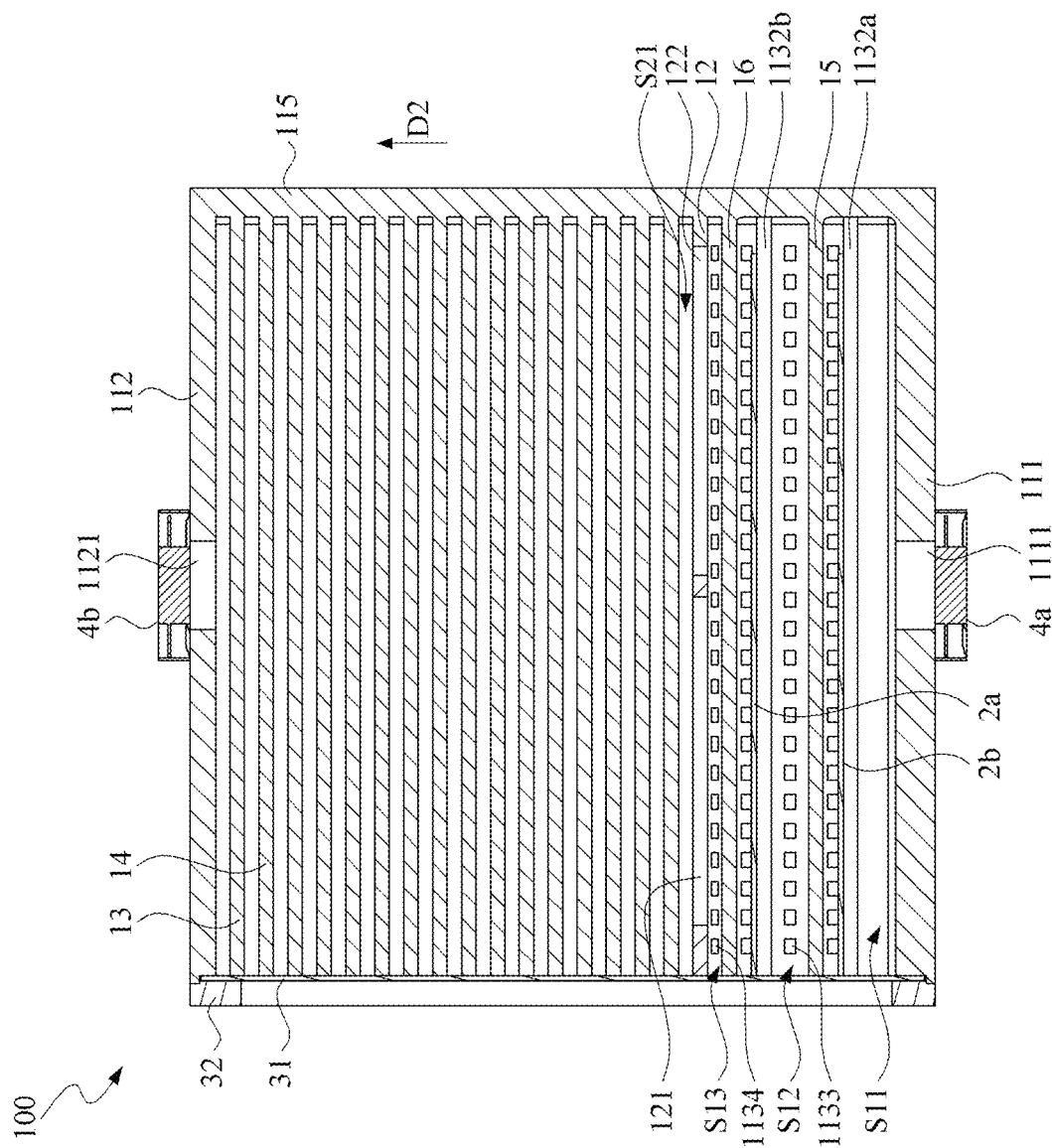
FIG. 4 is a schematic cross-sectional view of FIG. 2 along line B-B.
Figure 5:
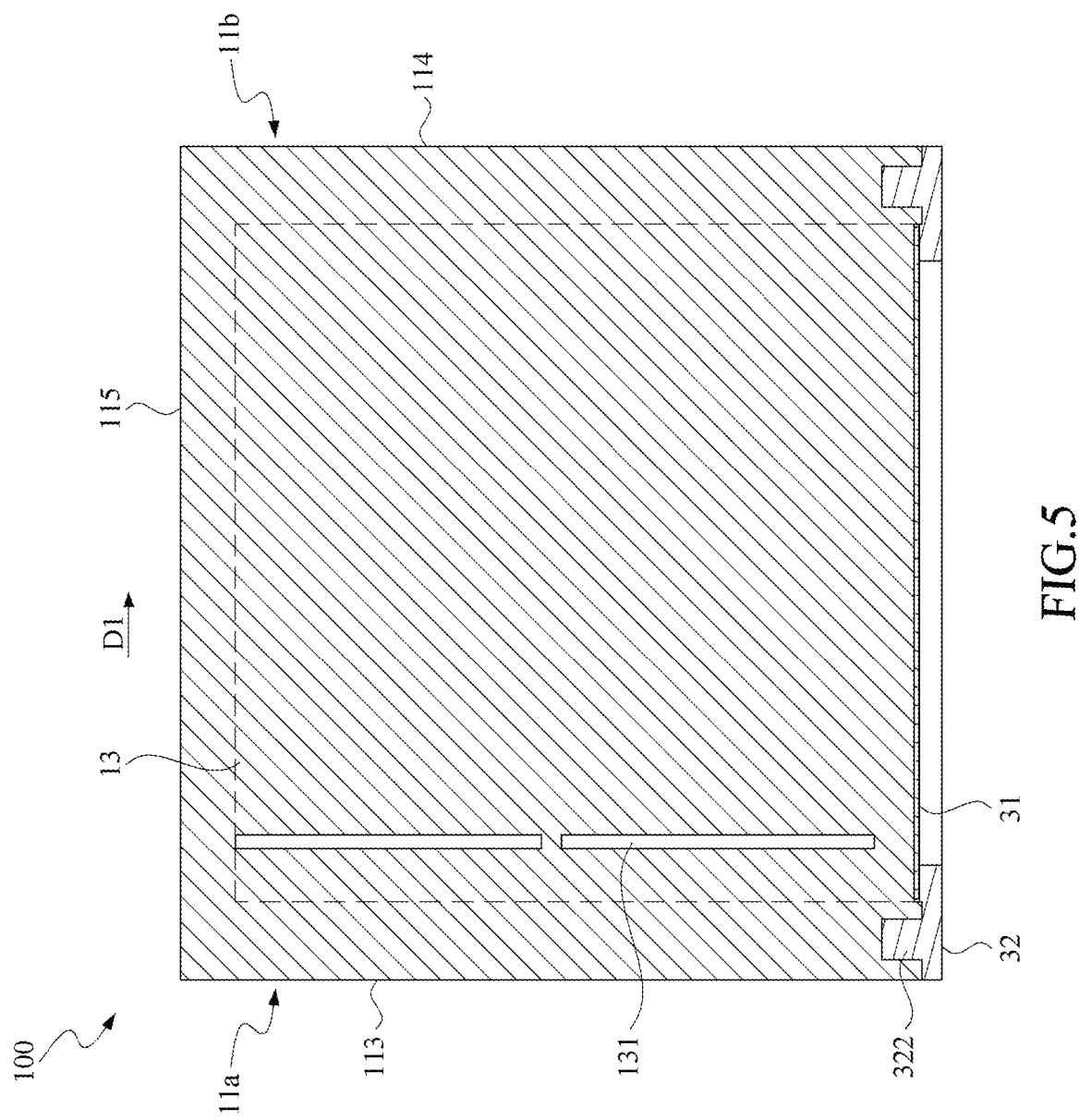
FIG. 5 is a schematic cross-sectional view of FIG. 2 along line C-C.

Refer to FIG. 1 through FIG. 5; where FIG. 1 is a schematic exploded view of a preferred embodiment of the plasma air purifying device in accordance with the present invention, FIG. 2 is a schematic perspective view of FIG. 1, FIG. 3 is a schematic cross-sectional view of FIG. 2 along line A-A, FIG. 4 is a schematic cross-sectional view of FIG. 2 along line B-B, and FIG. 5 is a schematic cross-sectional view of FIG. 2 along line C-C.

As shown in FIG. 1 to FIG. 5, the plasma air purifying device 100 includes a container 1, two plasma-generating elements 2a and 2b, a door frame assembly 3 and two fans 4a and 4b.

The container 1 includes a container body 11, an inter-zone partition plate 12, a plurality of first partition plates 13 (one labeled in the figure), a plurality of second partition plates 14 (one labeled in the figure) and two inter-layer partition plates 15 and 16. The container body 11 includes an air-inlet end plate 111, an air-outlet end plate 112 and three lateral plates 113, 114 and 115. In addition, the container body 11 has oppositely a first lateral side 11a and a second lateral side 11b.

The air-inlet end plate 111 is furnished with an air inlet 1111. The air-outlet end plate 112, disposed oppositely with respect to the air-inlet end plate 111, is furnished with an air outlet 1121. The lateral plate 113 and the lateral plate 114 are disposed to the first lateral side 11a and the second lateral side 11b, respectively. The lateral plate 115 is disposed between the lateral plate 113 and the lateral plate 114, and these three lateral plates 113, 114 and 115 are further connected individually with the air-inlet end plate 111 and the air-outlet end plate 112 so as to define thereinside an accommodating space S. In addition, the lateral plate 113, the lateral plate 114, the air-inlet end plate 111 and the air-outlet end plate 112 are further integrated to form an opening O connecting the accommodating space S, with respect to the lateral plate 115.

As described, the lateral plate 113 is further furnished with four positioning holes 1131 (one labeled in the figure) at a side of the opening O, and similarly the lateral plate 114 is furnished with four positioning holes 1141 (one labeled in the figure) at another side of the opening O.

The inter-zone partition plate 12, connected with the lateral plates 113, 114 and 115, are formed to divide the accommodating space S into a plasma zone S1 and a reaction zone (not labeled in the figure). In addition, the inter-zone partition plate 12 is furnished with two inter-zone connection channels 121 and 122 to connect spatially the plasma zone S1 and the reaction zone.

The plurality of first partition plates 13, disposed in the reaction zone, are individually extended from the first lateral side 11a to the second lateral side 11b in a first direction D1, and connected respectively with the lateral plates 113, 114 and 115. In particular, the plurality of first partition plates 13 are separately arranged parallel to each other in the reaction zone in a second direction D2 perpendicular to the first direction D1, and each of the first partition plates 13 is furnished with two first through channels 131 (one labeled in the figure) close to the first lateral side 11a.

The plurality of second partition plates 14, disposed in the reaction zone, are individually extended from the first lateral side 11a to the second lateral side 11b in the first direction D1, and connected respectively with the lateral plates 113, 114 and 115. In particular, the plurality of second partition plates 14 are separately arranged parallel to each other in the reaction zone in the second direction D2, and formed in a stagger manner with the plurality of first partition plates 13, such that a plurality of reaction chambers S21 (one labeled in the figure) can be formed in the reaction zone by the first partition plates 13 and the second partition plates 14. Each of the second partition plates 14 is furnished with two second through channels 141 (one labeled in the figure) close to the second lateral side 11b. Under such an arrangement, a repetitive bending reaction channel (not labeled in the figure) is formed by integrating spatially the plurality of reaction chambers S21, the first through channels 131 of the corresponding first partition plates 13, and the second through channels 141 of the corresponding second partition plates 14.

The inter-layer partition plates 15 and 16, connected respectively with the lateral plates 113, 114 and 115, are separately disposed in the plasma zone S1 in the second direction D2. The inter-layer partition plate 15 is located close to the air-inlet end plate 111, and the inter-layer partition plate 16 is located between the inter-layer partition plate 15 and the inter-zone partition plate 12, such that the plasma zone S1 can be divided into a first plasma-generating space S11, a second plasma-generating space S12 and a buffer space S13.

In this embodiment, the first plasma-generating space S11 is enclosed by the air-inlet end plate 111, the lateral plates 113, 114 and 115, and the inter-layer partition plate 15. The first plasma-generating space S11 is connected spatially with the air inlet 1111. Also, the second plasma-generating space S12 is enclosed by the lateral plates 113, 114 and 115, and the inter-layer partition plates 15 and 16. The second plasma-generating space S12 is connected spatially with the first plasma-generating space S11 through a plurality of inter-layer connection channels 1133 (one labeled in the figure) provided to the lateral plate 113 and a plurality of inter-layer connection channels 1143 (one labeled in the figure) provided to the lateral plate 114. As shown in FIG. 3 and FIG. 4, the buffer space S13 is enclosed by the lateral plates 113, 114 and 115, the inter-layer partition plate 16 and the inter-zone partition plate 12. The buffer space S13 is further connected spatially with the second plasma-generating space S12 via a plurality of inter-layer connection channels 1134 (one labeled in the figure) of the lateral plate 113 and also via a plurality of inter-layer connection channels 1144 (one labeled in the figure) of the lateral plate 11. In addition, the buffer space S13 is further connected spatially with one of the reaction chambers S21 that is closest to the inter-zone partition plate 12, via the inter-zone connection channels 121 and 122.

In this embodiment, the container 1 is formed by 3D printing, and thus all components in the container 1 can be formed as a unique structure, but not limited thereto. In other embodiments, components of the container 1 can be integrated by assembling or joining.

The plasma-generating elements 2a and 2b, disposed in the plasma zone S1, are used for generating plasma. In this embodiment, the lateral plate 113 further has two support structures 1132a and 1132b, and the lateral plate 114 also has two support structures 1142a and 1142b. As shown, the two support structures 1132a and 1142a are extended toward each other into the first plasma-generating space S11, so as to sustain the plasma-generating element 2b. Similarly, the two support structures 1132b and 1142b are extended toward each other into the second plasma-generating space S12, so as to sustain the plasma-generating element 2a. In addition, in this embodiment, each of the two plasma-generating elements 2a and 2b can be a DCSBD component. By having the plasma-generating element 2a as an example, the plasma-generating element 2a is formed by disposing two separate electrodes 21a and 22a on a carrier (not labeled in the figure), and the carrier can be glass. The two electrodes 21a and 22a can be further electrically connected to a high-voltage source by wiring (not labeled in the figure) through holes at the lateral plate 115, and thus the two electrodes 21a and 22a can be energized to produce plasma in the air. In particular, the two electrodes 21a and 22a can be two spiral patterns entangled with each other. In more detail, the two spiral patterns can extend individually in opposite directions from two starting points in an inward manner to form the entangled spirals, but not limited thereto. In some other embodiments, the entangled spirals can be formed into a hexagon or the like. Practically, the two electrodes 21a and 22a can be made of copper (Cu), aluminum oxide, indium tin oxide (ITO), indium zinc oxide (IZO), indium gallium zinc oxide (IGZO), titanium or tantalum.

The door frame assembly 3 includes a transparent partition 31 and a framework 32. The transparent partition 31, disposed at the opening O, can be a double-sided polished clear glass. The framework 32 has a window 321 and eight positioning structures 322 (one labeled in the figure). These eight positioning structure 322 are used to detachably fix the framework 32 by engaging the four positioning holes 1131 at the lateral plate 113 and the other four positioning holes 1141 at the lateral plate 114. Thereupon, while being fixed to the container body 11, the framework 32 contacts tightly against the transparent partition 31, such that the transparent partition 31 can seal the opening O. In practice, the inside of the accommodating space S can be directly observed through the window 321 and the transparent partition 31.

The two fans 4a and 4b, disposed respectively to the air inlet 1111 and the air outlet 1121, are used to drive the air to flow into the accommodation space S through the air inlet 1111, and further to flow out of the accommodating space S through the air outlet 1121.

In summary, in the art, the conventional plasma air purifying device simply allows the air to pass through a space filled with plasma, positive/negative ions, free radicals or ozone, and thereby a substantial amount of harmful substances failed to be handled would be discharged directly into the atmosphere with the air flow. On the other hand, the plasma air purifying device provided by the present invention utilizes the first partition plates and the second partition plates to divide the reaction zone into a plurality of reaction chambers, and the plurality of reaction chambers are further integrated spatially to form a unique repetitive bending reaction channel via the first through channels at the corresponding first partition plates and the second through channels at the corresponding second partition plates. Thereupon, after the air introduced from the air inlet enters the plasma zone filled with the plasma, the repetitive bending reaction channel can play a role to elongate the traveling pathway of the air in the plasma zone before the air is discharged into the atmosphere via the air outlet. As such, the harmful substances carried by the air flowing through the plasma zone would have sufficient time to be broken down by the plasma in the plasma zone, and thus the amount of harmful substances contained in the discharged air leaving the air outlet would be significantly reduced.

While the present invention has been particularly shown and described with reference to a preferred embodiment, it will be understood by those skilled in the art that various changes in form and detail may be without departing from the spirit and scope of the present invention.

What is claimed is:

1. A plasma air purifying device, comprising:
a container, including:
a container body, including:
an air-inlet end plate, furnished with an air inlet;
an air-outlet end plate, disposed oppositely to the air-inlet end plate, furnished with an air outlet;
a plurality of lateral plates, connected with the air-inlet end plate and the air-outlet end plate as a unique structure to enclose thereinside an accommodating space;
an inter-zone partition plate, connected with the plurality of lateral plates as a unique structure, dividing the accommodating space into a plasma zone and a reaction zone, the plasma zone being in communication with the air inlet, the reaction zone being in communication with the plasma zone and the air outlet, the inter-zone partition plate being furnished with at least one inter-zone connection channel, the at least one inter-zone connection channel being in communication with the plasma zone and the reaction zone; and
an inter-layer partition plate, connected with the plurality of lateral plates as a unique structure, dividing the plasma zone into a first plasma-generating space and a second plasma-generating space, the first plasma-generating space being in communication with the air inlet, the second plasma-generating space being in communication with the at least one inter-zone connection channel, the plurality of lateral plates being further furnished with at least one inter-layer connection channel, the at least one inter-layer connection channel being in communication with the first plasma-generating space and the second plasma-generating space;
a plurality of first partition plates, disposed in the reaction zone, individually extended from a first lateral side to a second lateral side in a first direction, separately arranged parallel to each other in the reaction zone in a second direction perpendicular to the first direction, each of the plurality of first partition plates being furnished with a first through channel close to the first lateral side; and
a plurality of second partition plates, disposed in the reaction zone, individually extended from the first lateral side to the second lateral side in the first direction, separately arranged parallel to each other in the reaction zone in the second direction and formed in a stagger manner with the plurality of first partition plates, each of the plurality of second partition plates being furnished with a second through channel close to the second lateral side; and
at least one plasma-generating element, disposed in the plasma zone, used for generating a plasma;
wherein the plurality of first partition plates and the plurality of second partition plates divide the reaction zone into a plurality of reaction chambers, the plurality of reaction chambers are in communication with the first through channels of the plurality of first partition plates and the second through channels of the plurality of second partition plates to form a repetitive bending reaction channel, the at least one inter-zone connection channel is in communication with the plasma zone and the repetitive bending reaction channel between the first lateral side and the second lateral side, the air inlet is in communication with the air outlet orderly via the plasma zone and the repetitive bending reaction channel, and thus the plasma purifies an air flowing through the air inlet, the plasma zone, the repetitive bending reaction channel and the air outlet to form a purified air.

2. The plasma air purifying device of claim 1, wherein the container body further has an opening in communication with the accommodating space, and the plasma air purifying device further includes a door frame assembly detachably assembled to seal the opening.

3. The plasma air purifying device of claim 2, wherein the door frame assembly includes:
a transparent partition, disposed at the opening; and
a framework, detachably positioned to the container body for contacting against the transparent partition so as to have the transparent partition to seal the opening.

4. The plasma air purifying device of claim 1, wherein the at least one plasma-generating element is a DCSBD (Diffuse coplanar surface barrier discharge) component.

5. The plasma air purifying device of claim 1, further including at least one fan disposed at the air inlet or the air outlet for driving the air to flow into the accommodating space via the air inlet and to flow out of the accommodating space via the air outlet.

\* \* \* \* \*